(12) United States Patent
Luthra et al.

(10) Patent No.: US 11,542,824 B2
(45) Date of Patent: Jan. 3, 2023

(54) ARTICLE FOR HIGH TEMPERATURE SERVICE

(71) Applicant: General Electric Company, Schenectady, NY (US)

(72) Inventors: Krishnan Lal Luthra, Guilderland, NY (US); Julin Wan, Rexford, NY (US); Reza Sarrafi-Nour, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 507 days.

(21) Appl. No.: 15/501,332

(22) PCT Filed: Aug. 18, 2015

(86) PCT No.: PCT/US2015/045593
§ 371 (c)(1),
(2) Date: Feb. 2, 2017

(87) PCT Pub. No.: WO2016/032789
PCT Pub. Date: Mar. 3, 2016

(65) Prior Publication Data
US 2017/0218779 A1 Aug. 3, 2017

Related U.S. Application Data

(60) Provisional application No. 62/041,184, filed on Aug. 25, 2014.

(51) Int. Cl.
*B32B 9/04* (2006.01)
*F01D 5/28* (2006.01)
(Continued)

(52) U.S. Cl.
CPC ............ *F01D 5/282* (2013.01); *C04B 41/009* (2013.01); *C04B 41/5035* (2013.01);
(Continued)

(58) Field of Classification Search
None
See application file for complete search history.

(56) References Cited

U.S. PATENT DOCUMENTS 5,422,321 A 6/1995 Whalen et al.
6,296,941 B1 10/2001 Eaton, Jr. et al.
(Continued)

FOREIGN PATENT DOCUMENTS

CN 103980006 A 8/2014
EP 2918698 A1 9/2015
(Continued)

OTHER PUBLICATIONS

International Search Report and Written Opinion issued in connection with corresponding PCT Application No. PCT/US2015/045593 dated Nov. 2, 2015.
(Continued)

*Primary Examiner* — Seth Dumbris
(74) *Attorney, Agent, or Firm* — Dority & Manning, P.A.

(57) ABSTRACT

An article for high temperature service is presented herein. One embodiment is an article including a substrate having a silicon-bearing ceramic matrix composite; and a layer disposed over the substrate, wherein the layer includes silicon and a dopant, the dopant including aluminum. In another embodiment, the article includes a ceramic matrix composite substrate, wherein the composite includes a silicon-bearing ceramic and a dopant, the dopant including aluminum; a bond coat disposed over the substrate, where the bond coat includes elemental silicon, a silicon alloy, a silicide, or combinations including any of the aforementioned; and a coating disposed over the bond coat, the coating including a silicate (such as an aluminosilicate or rare earth silicate), yttria-stabilized zirconia, or a combination including any of the aforementioned.

27 Claims, 1 Drawing Sheet

(51) Int. Cl.
*C23C 4/04* (2006.01)
*C04B 41/89* (2006.01)
*C04B 41/00* (2006.01)
*C04B 41/52* (2006.01)
*C04B 41/50* (2006.01)
*C04B 41/85* (2006.01)

(52) U.S. Cl.
CPC .............. *C04B 41/52* (2013.01); *C04B 41/85* (2013.01); *C04B 41/89* (2013.01); *C23C 4/04* (2013.01); *F01D 5/288* (2013.01); *F05D 2240/35* (2013.01); *F05D 2300/2261* (2013.01); *F05D 2300/2281* (2013.01); *F05D 2300/2283* (2013.01); *F05D 2300/6033* (2013.01); *Y10T 428/12056* (2015.01)

(56) References Cited

U.S. PATENT DOCUMENTS

| | | | |
|---|---|---|---|
| 6,299,988 | B1 | 10/2001 | Wang et al. |
| 6,410,148 | B1 | 6/2002 | Eaton, Jr. et al. |
| 6,777,093 | B1* | 8/2004 | Ojard ................. C04B 41/89 428/293.1 |
| 6,969,555 | B2 | 11/2005 | Meschter et al. |
| 8,343,589 | B2 | 1/2013 | Kirby et al. |
| 8,455,103 | B2 | 6/2013 | Louchet-Pouillerie et al. |
| 8,859,052 | B2 | 10/2014 | Kirby et al. |
| 9,771,826 | B2* | 9/2017 | Kirby ................. C04B 35/16 |
| 9,890,089 | B2 | 2/2018 | Kirby et al. |
| 9,926,461 | B2 | 3/2018 | Kang et al. |
| 2005/0013993 | A1* | 1/2005 | Li ................. C23C 26/00 427/446 |
| 2007/0184204 | A1 | 8/2007 | Balagopal et al. |
| 2009/0181257 | A1 | 7/2009 | Grote |
| 2009/0297718 | A1* | 12/2009 | Sarrafi-Nour ........ C04B 41/009 427/377 |
| 2010/0080984 | A1 | 4/2010 | Lee |
| 2011/0027557 | A1 | 2/2011 | Kirby et al. |
| 2011/0027559 | A1* | 2/2011 | Kirby ................. C04B 35/16 428/215 |
| 2011/0052925 | A1 | 3/2011 | Sarrafi-Nour et al. |
| 2011/0097589 | A1 | 4/2011 | Meschter et al. |
| 2011/0203281 | A1 | 8/2011 | Sarrafi-Nour et al. |
| 2013/0089720 | A1 | 4/2013 | Kirby et al. |
| 2013/0177441 | A1* | 7/2013 | Das ................. F01D 5/288 416/241 R |
| 2013/0344319 | A1 | 12/2013 | Zhu et al. |
| 2014/0050930 | A1* | 2/2014 | Das ................. C04B 41/90 428/448 |
| 2016/0017749 | A1 | 1/2016 | Luthra et al. |
| 2016/0024962 | A1 | 1/2016 | Luthra |

FOREIGN PATENT DOCUMENTS

| | | |
|---|---|---|
| FR | 2 899 226 A1 | 10/2007 |
| JP | H07038214 A | 2/1995 |
| JP | 2006/143553 A | 6/2006 |
| JP | 2010/070421 A | 4/2010 |
| JP | 2012/512966 A | 4/2015 |
| WO | WO2010/0080241 A1 | 7/2010 |
| WO | 2014/137804 A1 | 9/2014 |
| WO | 2014/186069 A1 | 11/2014 |

OTHER PUBLICATIONS

International Preliminary Report on Patentability issued in connection with corresponding PCT Application No. PCT/US2015/045593 dated Feb. 28, 2017.
Chinese Office Action Corresponding to Application No. 201580045747 dated Nov. 28, 2018.
Japanese Office Action Corresponding to Application No. 2017510565 dated Jul. 23, 2019.
European Office Action Corresponding to Application No. 15757083 dated Jul. 29, 2019.

* cited by examiner

ARTICLE FOR HIGH TEMPERATURE SERVICE

CROSS REFERENCE TO RELATED APPLICATION

This patent application is a national stage application under 35 U.S.C. § 371(c) of prior filed PCT application serial number PCT/US15/045593, filed on Aug. 18, 2015, which claims the benefit of U.S. Provisional Application No. 62/041,184, filed Aug. 25, 2014. The above-listed applications are herein incorporated by reference.

BACKGROUND

The present technology generally relates to high temperature machine components, such as components used in gas turbine assemblies, and to methods for protecting machine components from exposure to high temperature environments.

Ceramic materials containing silicon and metal alloys containing silicon have been proposed for structures used in high temperature applications as, for example, gas turbine engines, heat exchangers, internal combustion engines, and the like. Ceramic matrix composites (CMCs) that contain silicon carbide, such as composites including a silicon carbide matrix and silicon carbide reinforcement, have been used for these high temperature applications. However, the environments characteristic of these applications often contain reactive species, such as water vapor, which at high temperatures may cause significant degradation of the material structure. For example, water vapor has been shown to cause significant surface recession/thickness loss and mass loss in silicon-bearing materials. The water vapor reacts with the structural material at high temperatures to form volatile silicon-containing species, often resulting in unacceptably high recession rates.

Environmental barrier coating (EBC) systems are applied to silicon-bearing materials and other material susceptible to attack by reactive species, such as high temperature water vapor. EBC systems provide protection by prohibiting contact between the environment and the surface of the material. EBC systems applied to silicon-bearing materials, for example, are designed to be relatively stable chemically in high-temperature, water vapor-containing environments. One EBC system, as described in U.S. Pat. No. 6,410,148, comprises a silicon or silicon-containing bond layer (also referred to herein as a "bond coat") applied to a silicon-bearing substrate; an intermediate layer comprising mullite or a mullite-alkaline earth aluminosilicate mixture deposited over the bond layer; and a top layer comprising an alkaline earth aluminosilicate deposited over the intermediate layer. In another example, U.S. Pat. No. 6,296,941, the top layer is a yttrium silicate layer rather than an aluminosilicate.

Although turbine components and other articles that include such protective systems as described above have provided good performance, the prevailing trend towards harsher service conditions, including, for instance, increased operating temperatures for improved turbine efficiency, creates a continuing need in the industry for components with even higher temperature capability, along with methods for fabricating such articles.

BRIEF DESCRIPTION

Embodiments of the present invention are provided to meet this and other needs. One embodiment is an article comprising: a substrate comprising a silicon-bearing ceramic matrix composite; and a layer disposed over the substrate, wherein the layer comprises silicon and a dopant, the dopant comprising aluminum.

Another embodiment is an article comprising: a substrate comprising a silicon-bearing ceramic matrix composite; a bond coat disposed over the substrate, the bondcoat comprising elemental silicon, a silicon alloy, a silicide, or a combination including any of the aforementioned, and further comprising aluminum oxide at a concentration such that a ratio of aluminum atoms to the sum of aluminum atoms plus silicon atoms [Al/(Al+Si)] in the bond coat is in a range from 0.01 to 0.15; and a topcoat disposed over the bondcoat, the topcoat comprising a silicate (such as an aluminosilicate or rare earth silicate), yttria-stabilized zirconia, or a combination including any of the aforementioned.

Another embodiment is an article comprising: a substrate comprising a silicon-bearing ceramic matrix composite; a bondcoat disposed over the substrate, the bondcoat comprising silicon, a silicon alloy, a silicide, or combinations including any of the aforementioned, and optionally further comprising a dopant comprising aluminum oxide; an over-coat disposed over the bondcoat, the over-coat comprising silica and a dopant comprising aluminum oxide; and a topcoat disposed over the over-coat, the topcoat comprising a silicate (such as an aluminosilicate or rare earth silicate), yttria-stabilized zirconia, or a combination including any of the aforementioned.

Another embodiment is an article comprising: a ceramic matrix composite substrate, wherein the composite comprises a silicon-bearing ceramic and a dopant, the dopant comprising aluminum; a bond coat disposed over the substrate, where the bond coat includes elemental silicon, a silicon alloy, a silicide, or combinations including any of the aforementioned; and a coating disposed over the bond coat, the coating comprising a silicate (such as an aluminosilicate or rare earth silicate), yttria-stabilized zirconia, or a combination including any of the aforementioned.

BRIEF DESCRIPTION OF THE DRAWINGS

These and other features, aspects, and advantages of the present invention will become better understood when the following detailed description is read with reference to the accompanying drawing in which like characters represent like parts, wherein.

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In particular aspects of the present disclosure, the term "high temperature" refers to a range of between about 2200° F. and about 3000° F. (about 1200° C. and about 1650° C.).

The terms "silicon-containing" and "silicon-bearing" are used interchangeably herein to mean any material that includes, but is not limited to, silicon. Examples of such materials include without limitation elemental silicon, alloys and solid solutions that include silicon as a component, and compounds that include silicon. Similarly, the terms "aluminum-containing" and "aluminum-bearing" are used interchangeably herein to mean any material that includes, but is not limited to, aluminum. Examples of such materials include without limitation elemental aluminum, alloys and solid solutions including aluminum as a component, and compounds that include aluminum.

Figure 1:
FIG. 1 illustrates a cross section of an article in accordance with an embodiment of the present invention.

FIG. 1 depicts an article 100 illustrative of embodiments of the present invention. The article 100 includes one or more protective layers, such as layers 104, 106, and 110, disposed on a substrate 102. The one or more protective layers may be referred to collectively herein as an "environmental barrier coating system" or "EBC system." In one embodiment, the nature of article 100 may be as described in, for example, U.S. 2011/0052925 A1, any of the references discussed above, or other references describing coatings for protection of silicon-bearing articles at high temperatures. For illustrative purposes, article 100 in some embodiments includes a sealing layer 110, such as a layer including an alkaline-earth aluminosilicate, disposed over a substrate 102 of the article 100. The substrate 102 may be made from any suitable material, such as a ceramic or an intermetallic material. The substrate may comprise a ceramic, for example an oxide, nitride, or carbide. The substrate 102 may include a silicon-containing material, such as silicon nitride, molybdenum disilicide, or silicon carbide. This material may be a ceramic-matrix composite (CMC) material, such as a material made of a matrix phase and a reinforcement phase. The matrix phase, the reinforcement phase, or both of these phases may comprise a silicon-bearing ceramic, such as silicon carbide (SiC) or silicon nitride; composites including such materials are referred to herein as "silicon-bearing ceramic matrix composites." The article 100 may be a component of a gas turbine assembly, such as, for example, a combustion liner, transition piece, shroud, vane, or blade.

A bond coat 104 may be disposed over the substrate 102, and in some embodiments, such as the one illustrated in FIG. 1, bond coat 104 is disposed directly on substrate 102. Other layers, such as the sealing layer 110, if present, may be disposed over bond coat 104. The bond coat 104, in some embodiments, comprises silicon; for example, bond coat 104 may include a silicon alloy or elemental silicon, as described in, for example, U.S. Pat. No. 6,299,988, or a silicide, for example as described in U.S. Patent Application Publication No. US 20110097589 A1. The bond coat 104 may be used, for example, to mitigate thermal stresses or to inhibit chemical reactions between the substrate 102 and other layers, such as the sealing layer 110. The bond coat 104 may also be used as an oxygen barrier to prevent oxygen from chemically interacting with substrate 102.

Where the bondcoat 104 includes elemental silicon or silicon-containing material, an intermediate layer (not shown) may be disposed between the sealing layer 110 and bondcoat 104. The intermediate layer is made of a barrier material that is substantially inert with respect to silicon oxide to promote chemical stability in the EBC system. "Substantially inert" means that there is at most only incidental interaction (solubility or reactivity) between silica and the barrier material. Rare earth disilicates, such as disilicates of yttrium, ytterbium, lutetium, scandium, and other rare earth elements, are non-limiting examples of suitable barrier materials.

A topcoat 106, typically including some form of oxide material, may be disposed to provide thermal insulation (a thermal barrier coating), environmental protection (an environmental barrier coating), or a combination of these functions. The selection of a suitable topcoat material will depend on the type of environment the article is to be exposed to, the composition of the underlying coatings and substrate, the cost of processing, and other factors. The topcoat 106 may be a ceramic material including, but not limited to, a silicate (such as an aluminosilicate or rare earth silicate), and yttria-stabilized zirconia. The topcoat 106 may contain a rare earth monosilicate and/or rare earth disilicate. The topcoat 106 may be a dual-layer coating, with an outer layer of rare earth monosilicate and an inner layer of rare earth disilicate. The rare earth elements associated with these monosilicate and disilicate materials may include one or more of yttrium, ytterbium, lutetium, and scandium. The outer layer may be yttrium monosilicate and the inner layer may be a rare earth disilicate (such as yttrium disilicate, for example).

The thickness of any of the various coating layers described above may be chosen to provide adequate protection for a given service time while keeping thermal stresses to a sustainable level. Moreover, coating thickness may also be determined by the ability of a selected coating method to produce a continuous layer over the deposition area. Non-limiting examples of approximate thickness ranges for the various coatings include the following: for the sealing layer 110, from about 25 μm to about 150 μm; for the bondcoat 104, from about 75 μm to about 125 μm; for the intermediate layer, from about 50 μm to about 100 μm; for the topcoat 106, from about 50 μm to about 500 μm. For the dual-layer topcoat described above, the yttrium monosilcate outer layer may be from about 25 μm to about 50 μm. The coatings described above can be deposited using coating technology including, for example, but not limited to, plasma spray technology, chemical vapor deposition, and slurry-based coating processes; such techniques and their application to depositing coatings described herein will be apparent to one of ordinary skill in the art.

Figure 2:
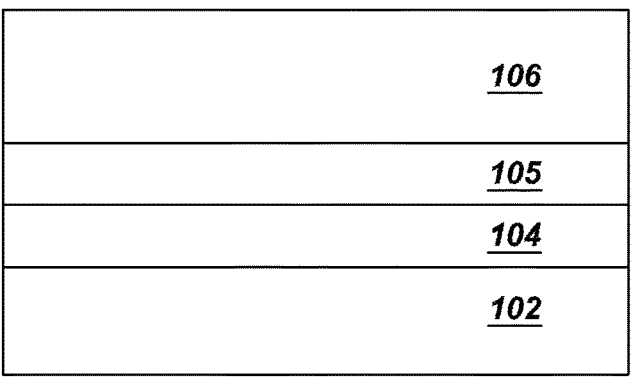
FIG. 2 illustrates a cross section of an article in accordance with another embodiment of the present invention.

In an article 100 that includes an EBC system, such as illustrated in FIGS. 1 and 2 herein, silicon-bearing components of the article, such as, for example, a silicon-bearing bond coat 104 and silicon carbide constituents of a CMC substrate 102, rely on protection against high temperature oxidation by formation of a dense silica film, which forms on exposure to oxidizing conditions. One of the limitations of conventional EBC systems is that, on exposure to high temperatures in oxidizing conditions, the silica film crystallizes. The crystallization can increase the oxidation rate of the underlying silicon-bearing material. Crystalline silica (crystobalite) goes through phase changes on cooling from an oxidation temperature of over approximately 2200 degrees Fahrenheit (approximately 1200° C.), and the crystallographic changes associated with the phase changes can induce cracking and spallation of the silica film, accelerating the oxidation of silicon and degrading adhesion of outer coating layers to the underlying CMC substrate.

Ceramic matrix composites used for gas turbine applications often include a silicon carbide fiber and a silicon carbide matrix, and are hence called "SiC/SiC" composites. These composites can be made in a wide variety of ways including by Chemical Vapor Infiltration (CVI) and by silicon Melt Infiltration (MI). Composites made by melt infiltration often also contain unreacted silicon in the matrix in addition to silicon carbide. Normally, composite substrates would not be directly exposed to oxidizing conditions unless the EBC detaches from the substrate. Silicon carbide exposed to high temperature, oxidizing conditions forms a protective silica film in the same fashion as elemental silicon. However, the oxidation of silicon carbide, such as at an exposed portion of CMC substrate or in a bond coat that includes silicon carbide, produces not only silica, but also carbon monoxide (CO). The carbon monoxide can diffuse out thru an amorphous silica film without causing substantially detrimental effects. However, it is unlikely that CO gas can readily diffuse thru a crystalline silica compound. Consequently, CO pressure can build up at the SiC/crystalline silica interface, causing the crystalline silica film to crack, further increasing the oxidation rate of underlying SiC. Thus, the crystallization can have even a more detrimental effect on the oxidation of silicon carbide than on that of silicon. Similar problems exist for other silicon-containing compounds that form gases on oxidation, such as silicon nitride.

To address this problem, article 100 in accordance with embodiments of the present invention further includes, in addition to any of the materials described above, an aluminum-containing dopant disposed to form and/or sustain an aluminum-containing silica film on exposure of article 100 to a high temperature, oxidative environment. The aluminum-containing silica film is more resistant to crystallization when exposed to an oxidizing atmosphere at high temperature than a film that does not contain aluminum-bearing dopant. The dopant is disposed in one or more portions of article 100 that may be susceptible to oxidation, such as bond coat 104, substrate 102, or both. As noted in further detail, below, the dopant additionally or alternatively may be disposed in a layer, such as a silica layer, over the substrate or over the bondcoat.

In one embodiment, article 100 includes substrate 102 and a layer, such as layer 104, disposed over substrate 102, and it is layer 104 that includes silicon and the dopant. In some embodiments, this silicon-bearing layer 104 is disposed directly on substrate 102. Examples of such embodiments include those where layer 104 is a bond coat in an EBC system, as described previously. A particular example is one in which layer 104 includes elemental silicon, although, as noted previously, silicon alloys and silicides are also examples of acceptable alternative materials for use in bond coat 104. In other embodiments, a doped silica-bearing layer is disposed as an over-coat 105 (FIG. 2) over a silicon-bearing bond coat 104 that is disposed on substrate 102. In an alternative embodiment, the doped silica layer may be directly disposed on substrate 102.

Substrate 102 comprises a silicon-bearing ceramic matrix composite, such as a composite that includes silicon carbide, silicon nitride, or a combination that includes one or both of these. As noted above, a SiC—SiC ceramic matrix composite is one example of a material for use in substrate 102.

Suitable aluminum-bearing dopants for use in the embodiments described herein include, without limitation, elemental aluminum, aluminum oxide, aluminum carbide, aluminum nitride, aluminum boride, and mixtures thereof. In certain embodiments, aluminum oxide is included as a dopant because it does not form any gaseous compound on oxidation. In some embodiments, aluminum oxide is present in layer 104 in the form of nanoparticles, meaning a plurality of particles having a median longest dimension less than about 1000 nanometers. In some embodiments, the median longest dimension of the nanoparticles is less than about 200 nanometers. The use of small-diameter particles, such as nanoparticles, for instance, may enhance the ability of the aluminum oxide to dissolve or otherwise disperse well within the silica film that forms during service in high temperature, oxidizing environments. Nanoparticles may be added to silicon-based coatings, for example, by applying techniques such as liquid-injection plasma spray, in which a slurry of silicon powder, dopant powder nanoparticles, and a liquid carrier is fed to a plasma torch and deposited as a doped, silicon-bearing coating. Other techniques, such as high-velocity oxyfuel deposition of mixed powder feedstock may be applied as well.

The amount of dopant present in the doped layer, such as layer 104, is selected to be sufficiently high to usefully reduce the rate of crystallization of silica at temperatures in the "high temperature" range noted previously relative to an undoped silica layer. On the other hand, the presence of the dopant may increase the oxygen transport rate through the silica film, and so the amount of dopant present is selected based on balancing these competing effects. In one embodiment, the amount of dopant is selected to be sufficiently low to avoid increasing the oxygen transport through the layer by more than a factor of about 10. For instance, in some embodiments the amount of dopant, such as aluminum oxide, is selected such that a ratio of aluminum atoms to the sum of aluminum atoms plus silicon atoms [Al/(Al+Si)] is in a range from 0.01 to 0.15. In certain embodiments, this ratio is about 0.01 to 0.10, which means the aluminum oxide level in a resulting silica film would be from about 0.5 to 5 mole percent. It is typically desirable to keep the aluminum level as low as possible but sufficiently high to reduce the silica crystallization to an acceptable level.

As noted previously, some embodiments of article 100 include topcoat 106. Any of the various coating architectures and candidate materials described above is suitable for use in embodiments employing an aluminum-doped, silicon-bearing layer 104. Particular examples of suitable oxides often employed as topcoat 106 include without limitation a silicate (such as an aluminosilicate or a rare earth silicate), yttria-stabilized zirconia, and combinations including any of these.

To further illustrate the concepts described above, one particular embodiment of article 100 includes a substrate 102 comprising a silicon-bearing ceramic-matrix composite, such as a SiC/SiC composite. A bond coat 104 is disposed over substrate 102, and this bond coat 104 includes elemental silicon, a silicon alloy, a silicide, or combinations that include one or more of these. Bond coat 104 further includes aluminum oxide as a dopant, at a concentration such that a ratio of aluminum atoms to the sum of aluminum atoms plus silicon atoms [Al/(Al+Si)] in the bond coat is in a range from 0.01 to 0.15. Topcoat 106 is disposed over bondcoat 104, with or without one or more intervening layers as noted previously, and topcoat 106 includes a silicate (such as an aluminosilicate or rare earth silicate), yttria-stabilized zirconia, or a combination including one or more of these.

As a further illustration, referring to FIG. 2, another particular embodiment of article 100 includes a substrate 102 comprising a silicon-bearing ceramic matrix composite, such as a SiC/SiC composite. A bond coat 104 is disposed over substrate 102, and this bond coat 104 includes elemental silicon, a silicon alloy, a silicide, or combinations that include one or more of these. Bond coat 104, in some embodiments, includes a dopant such as aluminum oxide as described above, while in other embodiments the bond coat 104 is not doped. An over-coat 105 is disposed over the bondcoat 104, the over-coat 105 comprising silica and a dopant comprising aluminum oxide. Topcoat 106 is disposed over over-coat 105, with or without one or more intervening layers as noted previously, and topcoat 106 includes a silicate, for example, an aluminosilicate or rare earth silicate; yttria-stabilized zirconia, or a combination including one or more of these.

Figure 3:
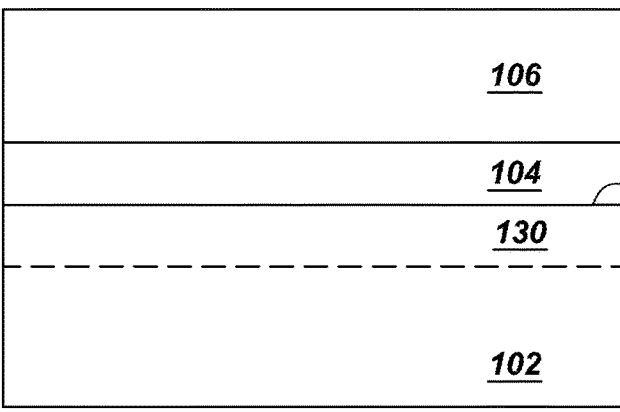
FIG. 3 illustrates a cross section of an article in accordance with another embodiment of the present invention.

In some embodiments, instead of or in addition to having dopant present in a layer disposed on a substrate, the dopant is disposed within the substrate itself. Referring to FIG. 3, in an embodiment illustrative of this aspect, article 100 includes a silicon-bearing ceramic matrix composite 102, such as a composite including silicon carbide, silicon nitride, or combinations including at least one of these. The composite 102 includes an aluminum-bearing dopant, which serves to incorporate aluminum into a silica film that forms on composite 102 should it become exposed to a high temperature, oxidative environment. The incorporation of aluminum from the doped composite 102 into the silica film helps to stabilize the amorphous form of the oxide, reducing the rate of silica crystallization at temperatures above about 2200 degrees Fahrenheit and thereby helping to prolong the useful life of article 100 as discussed previously.

In some embodiments, the dopant is present at least in a doped region 130 of composite 102; doped region 130 is typically inclusive of a surface 132 of article and extends at least about 25 micrometers (beneath surface 132. In other embodiments, the dopant is distributed substantially uniformly within the entirety of composite 102, and thus in this instance doped region 130 is coincident with the volume of composite 102. In certain embodiments, regardless of how the dopant is distributed within composite 102, the dopant is present in doped region 130 in a concentration range similar to that described above for doped coating layers; that is, the aluminum concentration within doped region 130 is selected such that a ratio of aluminum atoms to the sum of aluminum atoms plus silicon atoms [Al/(Al+Si)] within doped region 130 is in a range from 0.01 to 0.15. Similarly to what was described previously, the concentration of dopant in substrate 102 is typically selected to usefully reduce the rate of crystallization of silica at temperatures above 2200 degrees Fahrenheit, relative to an undoped silica layer, without increasing the oxygen transport through the layer by more than a factor of about 10.

Referring still to FIG. 3, article 100 often includes at least one coating 135 disposed over composite 102. Coating 135 may be part of an EBC system of a type commonly employed in the art to protect silicon-bearing ceramic composite materials from high temperature, oxidative environments, with possible coating architectures and materials for various layers as noted previously. As shown in FIG. 3, in certain embodiments article 100 includes a bond coat 104 disposed over the doped composite 102, and a topcoat 106 disposed over bond coat 104. In some embodiments, bond coat 104 also includes an aluminum-bearing dopant as described previously. Bond coat 104 may include silicon, such as elemental silicon, silicon alloys, or silicides; topcoat 106 may include one or more oxides such as a silicate (for instance, an aluminosilicate or rare earth silicate), or yttria stabilized zirconia. As described previously for common EBC systems generally, one or more intervening layers may be disposed between bond coat 104 and top coat 106.

To further illustrate embodiments of this type, referring to FIG. 3, an article 100 includes a ceramic matrix composite substrate 102, wherein the composite comprises a silicon-bearing ceramic and a dopant, the dopant comprising aluminum; a bond coat 104 disposed over substrate 102, where the bond coat 104 includes elemental silicon, a silicon alloy, a silicide, or combinations including one or more of these; and a topcoat 106 disposed over bond coat 104, the top coat 106 comprising a a silicate (such as an aluminosilicate or rare earth silicate), yttria-stabilized zirconia, or a combination including any of the aforementioned. In some embodiments, bond coat 104 further includes a dopant comprising aluminum oxide.

Example

The following example is presented to further illustrate non-limiting embodiments of the present invention.

Substrates made of silicon carbide were coated with an EBC system that included a silicon-bearing bond coat. In a baseline sample, the bond coat did not include a dopant, while a test sample included about 10 percent by weight aluminum oxide [an Al/(Al+Si) ratio of about 0.06]. The bond coats were deposited by plasma spray; in the case of the doped bond coat, the alumina was added to the coating by feeding a mixture of silicon powder and aluminum oxide powder (nominal median diameter 15 micrometers) to a plasma spray torch and co-depositing the materials. The samples were exposed to an oxygen-bearing environment at about 1400 degrees Celsius (2550 degrees Fahrenheit) for 1500 hours and then the bond coat was examined. In the baseline sample, the undoped bond coat was completely crystallized, while in the test sample, the doped bond coat exhibited two distinct regions: a crystallized region and an amorphous region. This result suggests aluminum doping helps to forestall the crystallization of the bond coat at extended exposure to elevated temperature in an oxidizing environment, relative to the rate shown for undoped material.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An article comprising:
   a substrate comprising a silicon-bearing ceramic matrix composite;
   a bond coat disposed directly on the substrate, the bond coat comprising elemental silicon, a silicon alloy, a silicide, or a combination thereof and a first dopant comprising aluminum oxide in a form of nanoparticles having a median longest dimension less than 1000 nanometers and at a concentration such that a ratio of aluminum atoms to a sum of aluminum atoms plus silicon atoms [Al/(Al+Si)] is in a range from 0.01 to 0.15; and an over-coat disposed on the bond coat, the over-coat comprising silica and a second dopant comprising aluminum.

2. The article of claim 1, wherein the article comprises a gas turbine combustion liner, a gas turbine transition piece, a gas turbine shroud, a gas turbine vane, or a gas turbine blade.

3. The article of claim 1, wherein the silicon-bearing ceramic matrix composite comprises silicon carbide, silicon nitride, or a combination including any of the aforementioned.

4. The article of claim 1, wherein the bond coat has a thickness of from about 75 µm to about 125 µm.

5. The article of claim 1, wherein the bond coat comprises a silicon alloy.

6. The article of claim 1, wherein the bond coat comprises elemental silicon.

7. The article of claim 1, wherein the bond coat comprises a silicide.

8. The article of claim 1, wherein aluminum is present in the bond coat at a concentration such that a ratio of aluminum atoms to a sum of aluminum atoms plus silicon atoms [Al/(Al+Si)] is in a range from 0.01 to 0.10.

9. The article of claim 1, wherein the second dopant comprises a material selected from the group consisting of aluminum, aluminum oxide, aluminum carbide, aluminum nitride, aluminum boride, and combinations including any of the aforementioned.

10. The article of claim 1, wherein the second dopant comprises aluminum oxide.

11. The article of claim 1, wherein the aluminum oxide is present in the bond coat in the form of nanoparticles having a median longest dimension less than 200 nanometers.

12. The article of claim 1, further comprising a top coat disposed over the bond coat and the over-coat, the top coat comprising an oxide.

13. The article of claim 12, wherein the top coat comprises a silicate, yttria-stabilized zirconia, or a combination of the aforementioned.

14. The article of claim 13, wherein the silicate is an aluminosilicate and/or a rare earth silicate.

15. An article comprising:
a substrate comprising a silicon-bearing ceramic matrix composite;
a bond coat disposed directly on the substrate, the bond coat comprising elemental silicon, a silicon alloy, a silicide, or a combination thereof and a first dopant comprising aluminum oxide in a form of nanoparticles having a median longest dimension less than 1000 nanometers; and
an over-coat disposed on the bond coat, the over-coat comprising silica and a second dopant comprising aluminum, wherein the substrate further comprises a third dopant comprising aluminum in at least a doped region.

16. The article of claim 15, wherein the third dopant is present at a concentration such that a ratio of aluminum atoms to a sum of aluminum atoms plus silicon atoms [Al/(Al+Si)] is in a range from 0.01 to 0.15.

17. An article comprising:
a substrate comprising a silicon-bearing ceramic matrix composite;
a bond coat disposed directly on the substrate, the bond coat comprising elemental silicon, a silicon alloy, a silicide, or a combination including any of the aforementioned, and aluminum oxide in a form of nanoparticles having a median longest dimension less than 1000 nanometers at a concentration such that a ratio of aluminum atoms to a sum of aluminum atoms plus silicon atoms [Al/(Al+Si)] in the bond coat is in a range from 0.01 to 0.15; and
a top coat disposed over the bond coat, the top coat comprising a silicate, yttria-stabilized zirconia, or a combination of the aforementioned.

18. The article of claim 17, wherein the silicate is an aluminosilicate and/or a rare earth silicate.

19. The article of claim 17, wherein the article comprises a gas turbine combustion liner, a gas turbine transition piece, a gas turbine shroud, a gas turbine vane, or a gas turbine blade.

20. The article of claim 17, wherein the silicon-bearing ceramic matrix composite comprises silicon carbide, silicon nitride, or a combination including any of the aforementioned.

21. The article of claim 17, wherein the bond coat has a thickness of from about 75 µm to about 125 µm.

22. The article of claim 17, wherein the top coat has a thickness of from about 50 µm to about 500 µm.

23. An article comprising:
a substrate comprising a silicon-bearing ceramic matrix composite;
a bond coat disposed directly on the substrate, the bond coat comprising silicon, a silicon alloy, a silicide, or combinations including any of the aforementioned, and further comprising a dopant comprising aluminum oxide in a form of nanoparticles having a median longest dimension less than 1000 nanometers and at a concentration such that a ratio of aluminum atoms to a sum of aluminum atoms plus silicon atoms [Al/(Al+Si)] is in a range from 0.01 to 0.15;
an over-coat disposed over the bond coat, the over-coat comprising silica and a dopant comprising aluminum oxide; and
a top coat disposed over the over-coat, the top coat comprising a silicate, yttria-stabilized zirconia, or a combination of the aforementioned.

24. The article of claim 23, wherein the silicate is an aluminosilicate and/or a rare earth silicate.

25. The article of claim 23, wherein the article comprises a gas turbine combustion liner, a gas turbine transition piece, a gas turbine shroud, a gas turbine vane, or a gas turbine blade.

26. The article of claim 23, wherein the silicon-bearing ceramic matrix composite comprises silicon carbide, silicon nitride, or a combination including any of the aforementioned.

27. The article of claim 23, wherein the bond coat has a thickness of from about 75 µm to about 125 µm.

\* \* \* \* \*